Nov. 27, 1928. 1,692,931
J. G. DOW
APPARATUS FOR SEPARATING EGGS
Filed Aug. 27, 1927 2 Sheets-Sheet 1
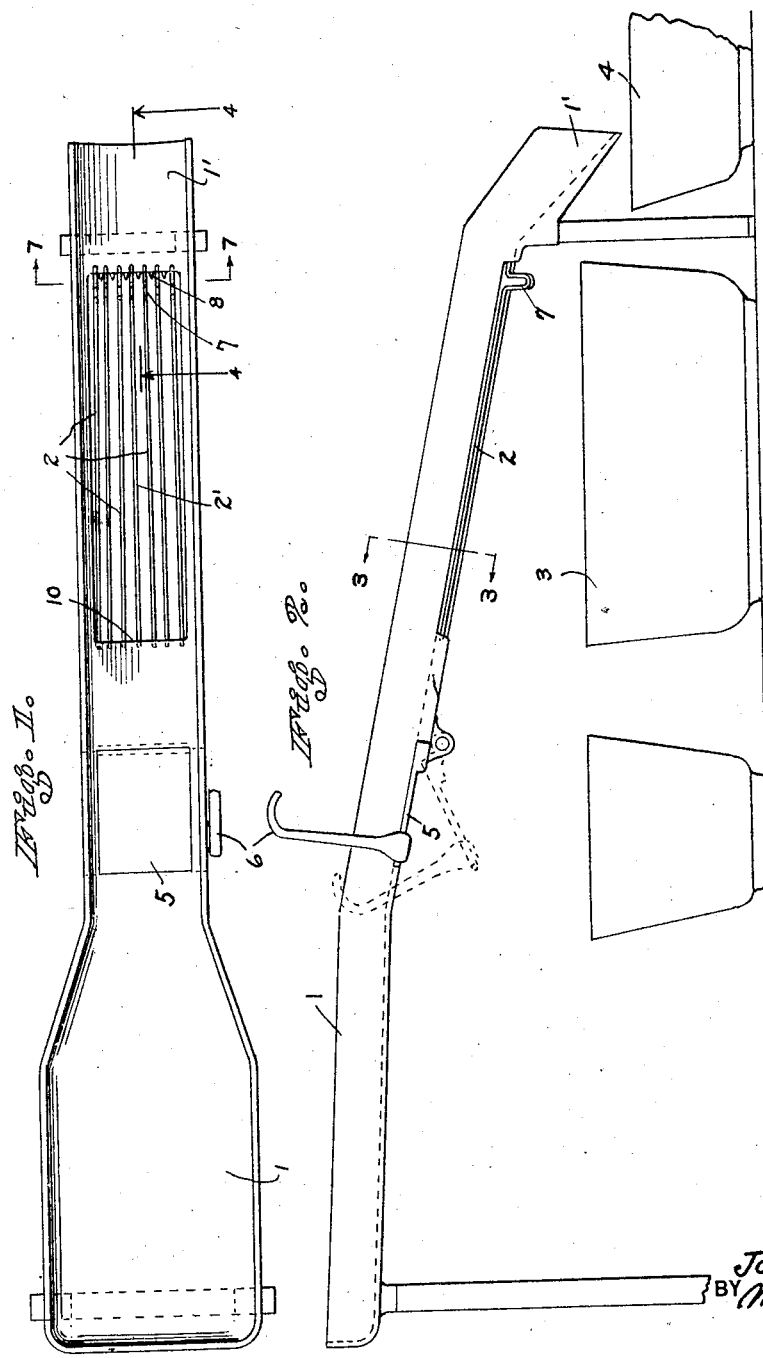
INVENTOR
John G. Dow
BY Miller & Boyken
ATTORNEYS Nov. 27, 1928.
J. G. DOW
1,692,931
APPARATUS FOR SEPARATING EGGS
Filed Aug. 27, 1927
2 Sheets-Sheet 2
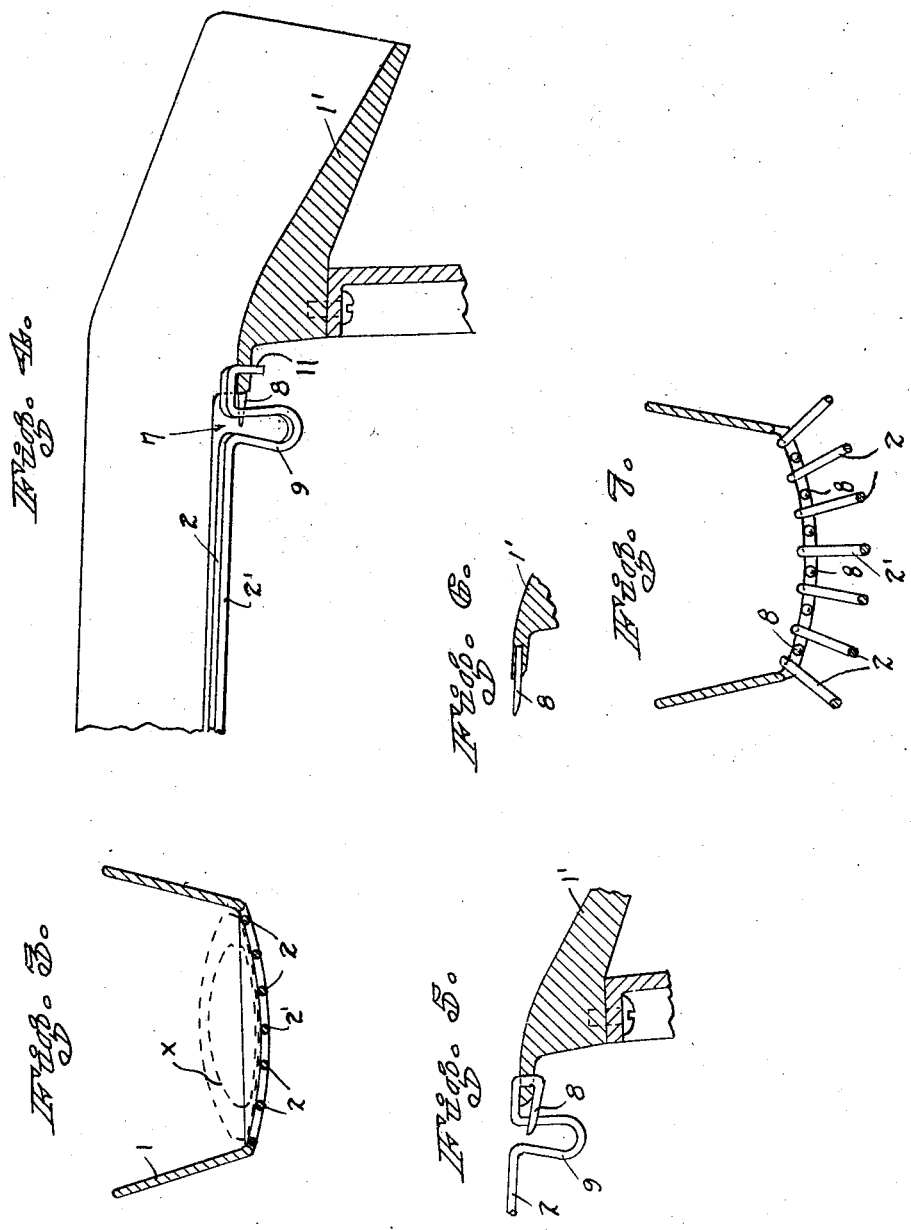

Patented Nov. 27, 1928.

1,692,931

UNITED STATES PATENT OFFICE.

JOHN G. DOW, OF SAN FRANCISCO, CALIFORNIA, ASSIGNOR OF ONE-HALF TO THOMAS P. GALVIN AND ONE-THIRD TO JOHN C. BURDICK.

APPARATUS FOR SEPARATING EGGS.

Application filed August 27, 1927. Serial No. 215,919.

This invention relates to devices for separating the whites from the yolks of raw eggs, and particularly to such a device as shown and described in my pending joint application for patent on egg separator filed on April 13, 1927 under Serial No. 183,557, being in fact an improvement on the construction there shown.

The objects of the present improvements are to effect a better separation of the whites from the yolks and to reduce the danger of breakage of the yolks.

Briefly described the improvements comprise certain changes in the wire separating elements of the device, but the entire apparatus is shown in the drawings accompanying this application in order to make the improvements easily understood.

In the drawings Fig. 1 is a reduced plan view of the apparatus, Fig. 2 a side elevation of Fig. 1, Fig. 3 a substantially full size section of the trough of the apparatus as seen from the line 3—3 of Fig. 2, and Fig. 4 is a substantially full size fragmentary section of the trough as seen from the line 4—4 of Fig. 1.

Figs. 5 and 6 are sections showing optional construction of the impaling points and Fig. 7 is a section of Fig. 1 along the line 7—7 thereof.

The apparatus comprises as in the earlier disclosure an inclined trough 1 in the upper end of which the broken eggs are dropped for sliding down over the separator wires 2 for discharge of the whites therethrough to a dish 3 and yolks over the lower end 1' of the trough to a dish 4. A spring returned trap door 5 actuated by a handle 6 serving for discharge of any bad eggs from the upper portion of the trough before they have reached the separator wires.

In the apparatus of the prior application it was found that occasionally too much of the whites would drag over with the yolk, and also that sometimes a yolk would break. These objections I succeeded in overcoming by forming a gap in the separating wires 2 adjacent their lower ends as shown at 7 so that any part of the whites not having already drained through the wires would drop into this gap just before being impaled by the spurs 8 projecting toward the upper end of the trough, and the yolks would ride over the gap.

The gap 7 was made by forming a loop 9 in each wire, and it will be noticed that this loop is enlarged in a downward direction so as to avoid entrapping a thick part of the white, in other words, to pass anything which fell through the reduced gap 7.

The loops also extended in a downwardly diverging manner from one another as shown in Fig. 7 so that the spaces between them became wider in a downward direction.

The wires also diverged slightly in their spacing toward the upper part of the trough as indicated in Fig. 1, a feature which was found to close in, as it were, on the whites hanging between them, as the eggs slid downwardly and thus more effectively strip the whites from the yolks.

A further feature is in one of the wires 2' being in the center of the curvature formed by them as shown in Fig. 3. This put a support directly in the middle of the yolk (indicated by dotted line X in Fig. 3) and greatly reduced the tendency to breakage of the yolks. The first model of the device had a space in the center which appears to have permitted a downward central pressure to build up in the yolke with consequent rupture in some cases, and which the central support overcomes.

A feature of construction is the insertion of the wires in holes drilled in the upper edge of the cut-out 10 of the trough which is bridged by the wires, and the lower ends being hooked at 11 and snapped through holes drilled through the bottom of the trough adjacent the lower edge of the cut-out. This provides for easy repair or removal of the wires if desired.

The prongs or spurs 8 are preferably cast or formed integral with the body between the wires as shown in Figs. 1 and 4 but may be separately inserted as shown in Fig. 6, or may be formed of the wires 2 by a return bend as indicated in Fig. 5.

The arrangement of wires, converging downwardly in their spacing, also prevents the descending eggs from sliding to one side, which they sometimes did with the prior apparatus with consequent imperfect separation of the whites.

I claim:

1. In an apparatus for separating the whites from the yolks of eggs, a plurality of downwardly slanting laterally spaced wires over which the eggs are adapted to slide, said wires provided with a gap formed by a downward looping of the wires adapted to catch the whites and for the yolks to ride over.

2. In an apparatus for separating the whites from the yolks of eggs, a plurality of spaced wires formed into a downwardly extending drainage surface over which the eggs are adapted to slide, said wires converging downwardly and formed with downwardly extending loops near their lower ends.

3. In a structure as specified in claim 2 said loops diverging from each side toward the center.

4. In an apparatus for separating the whites from the yolks of eggs, a downwardly extending trough provided with a bottom formed of longitudinally extending laterally spaced wires passing over a cut-out in the bottom of the trough, and a series of prongs formed integral with the body of the trough in the spaces between the wires.

JOHN G. DOW.

CERTIFICATE OF CORRECTION.

Patent No. 1,692,931.             Granted November 27, 1928, to

JOHN G. DOW.

It is hereby certified that the above numbered patent was erroneously issued to the inventor said "Dow, one-half to Thomas P. Galvin and one-third to John C. Burdick", whereas said patent should have been issued to the inventor said "Dow, one-third to Thomas P. Galvin and one-third to John C. Burdick", as assignees of the entire interest in said invention, as shown by the records of assignments in this office; and that the said Letters Patent should be read with this correction therein that the same may conform to the record of the case in the Patent Office.

Signed and sealed this 19th day of February, A. D. 1929.

(Seal)                                                  M. J. Moore,
                                                        Acting Commissioner of Patents.